US009013576B2

(12) United States Patent
Ohtomo et al.

(10) Patent No.: US 9,013,576 B2
(45) Date of Patent: Apr. 21, 2015

(54) AERIAL PHOTOGRAPH IMAGE PICKUP METHOD AND AERIAL PHOTOGRAPH IMAGE PICKUP APPARATUS

(75) Inventors: Fumio Ohtomo, Tokyo-to (JP); Kazuki Osaragi, Tokyo-to (JP); Tetsuji Anai, Tokyo-to (JP); Hitoshi Otani, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 315 days.

(21) Appl. No.: 13/473,659

(22) Filed: May 17, 2012

(65) Prior Publication Data

US 2012/0300070 A1 Nov. 29, 2012

(30) Foreign Application Priority Data

May 23, 2011 (JP) ................................. 2011-114651
Nov. 24, 2011 (JP) ................................. 2011-255996

(51) Int. Cl.
*H04N 7/18* (2006.01)
*G01C 11/02* (2006.01)
*G05D 1/00* (2006.01)
*G03B 15/00* (2006.01)
(Continued)

(52) U.S. Cl.
CPC .............. *G01C 11/02* (2013.01); *G05D 1/0094* (2013.01); *G03B 15/006* (2013.01); *G03B 35/02* (2013.01); *G03B 37/02* (2013.01)

(58) Field of Classification Search
CPC ..... G01C 11/02; H04N 7/18; G06K 9/00771; G06K 9/00; G08B 13/196
USPC ........................................................ 348/144
See application file for complete search history.

(56) References Cited

U.S. PATENT DOCUMENTS 4,005,818 A 2/1977 Krause et al.
4,359,733 A 11/1982 O'Neill
(Continued)

FOREIGN PATENT DOCUMENTS

EP 1659365 A1 5/2006
JP 5-24589 A 2/1993
(Continued)

OTHER PUBLICATIONS

Final Rejection mailed Feb. 11, 2014 in co-pending U.S. Appl. No. 13/453,242.
(Continued)

*Primary Examiner* — Shan Elahi
(74) *Attorney, Agent, or Firm* — Nields, Lemack & Frame, LLC

(57) ABSTRACT

An aerial photographing image pickup method comprises a step of making a flying object fly meanderingly, a step of taking the image at each vertex where a direction is changed in the meandering flight, a step of extracting feature points from a common overlay portion of the images taken from at least three adjacent vertices, a step of determining two images of two vertices in the images as one set and acquiring positional information of the two vertices by a GPS device for each set regarding at least two sets, a step of performing photogrammetry of the measuring points corresponding to the feature points based on positional information and based on the feature points of the two images and a step of determining the feature points when the surveying results of the measuring points coincide with each other in at least the two sets as tie points for image combination.

4 Claims, 6 Drawing Sheets

(51) Int. Cl.
*G03B 35/02* (2006.01)
*G03B 37/02* (2006.01)

(56) References Cited

U.S. PATENT DOCUMENTS

| | | | |
|---|---|---|---|
| 4,404,553 A | 9/1983 | Cuffia | |
| 4,490,028 A | 12/1984 | Kucher | |
| 5,235,513 A | 8/1993 | Velger et al. | |
| 5,490,075 A | 2/1996 | Howard et al. | |
| 5,559,510 A | 9/1996 | Strong, III et al. | |
| 5,986,581 A | 11/1999 | Magdaleno, II et al. | |
| 6,006,158 A | 12/1999 | Pilley et al. | |
| 6,084,510 A | 7/2000 | Lemelson et al. | |
| 6,193,190 B1 | 2/2001 | Nance | |
| 6,405,975 B1 | 6/2002 | Sankrithi et al. | |
| 6,442,293 B1 | 8/2002 | Ito et al. | |
| 6,608,559 B1* | 8/2003 | Lemelson et al. | 340/539.13 |
| 6,626,078 B2 | 9/2003 | Thornton | |
| 6,694,064 B1 | 2/2004 | Benkelman | |
| 6,731,331 B1 | 5/2004 | Watabe et al. | |
| 6,995,792 B1 | 2/2006 | Ogura | |
| 7,010,401 B1 | 3/2006 | Richburg et al. | |
| 7,391,340 B2 | 6/2008 | Malhomme | |
| 7,418,320 B1 | 8/2008 | Bodin et al. | |
| 7,552,025 B2 | 6/2009 | Ohtomo et al. | |
| 7,590,484 B2 | 9/2009 | Gellert | |
| 7,666,682 B2 | 2/2010 | Armentrout et al. | |
| 7,671,998 B2 | 3/2010 | Ohtomo et al. | |
| 7,725,257 B2* | 5/2010 | Strelow et al. | 701/448 |
| 7,726,033 B2 | 6/2010 | Ohtomo et al. | |
| 7,755,513 B2 | 7/2010 | Wang et al. | |
| 7,804,996 B2 | 9/2010 | Ohtomo et al. | |
| 8,078,349 B1 | 12/2011 | Prada Gomez et al. | |
| 8,218,131 B2 | 7/2012 | Otani et al. | |
| 8,422,777 B2 | 4/2013 | Aller | |
| 8,422,825 B1* | 4/2013 | Neophytou et al. | 382/294 |
| 8,589,071 B2 | 11/2013 | Feyereisen et al. | |
| 8,630,755 B2 | 1/2014 | Ohtomo et al. | |
| 8,666,571 B2 | 3/2014 | Ohtomo et al. | |
| 2001/0016053 A1* | 8/2001 | Dickson et al. | 382/110 |
| 2002/0085094 A1 | 7/2002 | Teuchert | |
| 2002/0089588 A1 | 7/2002 | LeCompte | |
| 2002/0163582 A1 | 11/2002 | Gruber et al. | |
| 2004/0041999 A1 | 3/2004 | Hogan et al. | |
| 2004/0073578 A1 | 4/2004 | Nam et al. | |
| 2004/0234122 A1 | 11/2004 | Kochi et al. | |
| 2004/0264763 A1 | 12/2004 | Mas et al. | |
| 2005/0084975 A1 | 4/2005 | Armentrout et al. | |
| 2005/0125142 A1 | 6/2005 | Yamane | |
| 2005/0165517 A1 | 7/2005 | Reich | |
| 2005/0286760 A1 | 12/2005 | Ohtomo et al. | |
| 2006/0239539 A1* | 10/2006 | Kochi et al. | 382/154 |
| 2007/0025595 A1 | 2/2007 | Koizumi et al. | |
| 2007/0093945 A1* | 4/2007 | Grzywna et al. | 701/23 |
| 2007/0127101 A1 | 6/2007 | Oldroyd | |
| 2008/0059065 A1* | 3/2008 | Strelow et al. | 701/213 |
| 2008/0063299 A1 | 3/2008 | Murai et al. | |
| 2008/0071431 A1 | 3/2008 | Dockter et al. | |
| 2008/0075325 A1 | 3/2008 | Otani et al. | |
| 2008/0111815 A1* | 5/2008 | Graves et al. | 345/420 |
| 2008/0273753 A1* | 11/2008 | Giuffrida et al. | 382/103 |
| 2008/0298638 A1* | 12/2008 | Miyazaki | 382/106 |
| 2009/0015685 A1* | 1/2009 | Shulman | 348/222.1 |
| 2009/0087029 A1* | 4/2009 | Coleman et al. | 382/103 |
| 2009/0122133 A1 | 5/2009 | Hartman | |
| 2009/0154793 A1* | 6/2009 | Shin et al. | 382/154 |
| 2009/0306840 A1 | 12/2009 | Blenkhorn et al. | |
| 2010/0013927 A1* | 1/2010 | Nixon | 348/144 |
| 2010/0033371 A1 | 2/2010 | Kumagai et al. | |
| 2010/0061701 A1* | 3/2010 | Iwane | 386/95 |
| 2010/0070111 A1 | 3/2010 | Akcasu | |
| 2010/0277587 A1 | 11/2010 | Pechatnikov et al. | |
| 2010/0295855 A1 | 11/2010 | Sasakawa et al. | |
| 2011/0049290 A1 | 3/2011 | Seydoux et al. | |
| 2011/0090337 A1 | 4/2011 | Klomp et al. | |
| 2011/0137547 A1* | 6/2011 | Kwon et al. | 701/200 |
| 2011/0196598 A1 | 8/2011 | Feyereisen et al. | |
| 2011/0307126 A1 | 12/2011 | Hogstrom | |
| 2012/0007982 A1* | 1/2012 | Giuffrida et al. | 348/144 |
| 2012/0050524 A1* | 3/2012 | Rinner et al. | 348/117 |
| 2012/0078451 A1 | 3/2012 | Ohtomo et al. | |
| 2012/0173053 A1* | 7/2012 | Ohtomo et al. | 701/4 |
| 2012/0200703 A1 | 8/2012 | Nadir et al. | |
| 2012/0215388 A1 | 8/2012 | Pepitone et al. | |
| 2012/0249739 A1 | 10/2012 | Gostynski et al. | |
| 2012/0261516 A1 | 10/2012 | Gilliland et al. | |
| 2012/0277934 A1 | 11/2012 | Ohtomo et al. | |
| 2013/0062457 A1* | 3/2013 | Deakin | 244/25 |
| 2013/0135440 A1 | 5/2013 | Ohtomo et al. | |
| 2013/0142500 A1 | 6/2013 | Yavin | |
| 2014/0055613 A1 | 2/2014 | Ohtomo et al. | |
| 2014/0119716 A1 | 5/2014 | Ohtomo et al. | |

FOREIGN PATENT DOCUMENTS

| | | |
|---|---|---|
| JP | 8-159762 A | 6/1996 |
| JP | 8-285588 A | 11/1996 |
| JP | 2662111 B2 | 10/1997 |
| JP | 9-302628 A | 11/1997 |
| JP | 2000-85694 A | 3/2000 |
| JP | 2000-280995 A | 10/2000 |
| JP | 2001-39397 A | 2/2001 |
| JP | 2004-245741 A | 9/2004 |
| JP | 2005-115623 A | 4/2005 |
| JP | 2006-10376 A | 1/2006 |
| JP | 2006-500266 A | 1/2006 |
| JP | 3808833 B2 | 8/2006 |
| JP | 2007-171048 A | 7/2007 |
| JP | 2008-76303 A | 4/2008 |
| JP | 2009-33366 A | 2/2009 |
| JP | 4253239 B2 | 4/2009 |
| JP | 2010-38822 A | 2/2010 |
| JP | 2011-86895 A | 4/2011 |
| JP | 2011-89895 A | 5/2011 |
| JP | 2012-71645 A | 4/2012 |
| JP | 2012-140101 A | 7/2012 |
| JP | 2012-232654 A | 11/2012 |
| JP | 2012-242321 A | 12/2012 |
| WO | 2004/027434 A1 | 4/2004 |
| WO | 2008/152740 A1 | 12/2008 |

OTHER PUBLICATIONS

Office Action mailed Mar. 20, 2014 in co-pending U.S. Appl. No. 14/059,784.
Extended European Search Report mailed May 23, 2013 in co-pending European patent application No. EP 12165456.
Office Action mailed Jul. 16, 2013 in co-pending U.S. Appl. No. 13/453,242.
European communication issued Oct. 22, 2014 in corresponding European patent application No. 12168267.8.
Office Action mailed Jul. 2, 2014 in co-pending U.S. Appl. No. 13/453,242.
Final Rejection mailed Jun. 30, 2014 in co-pending U.S. Appl. No. 14/059,784.
Office Action mailed Jul. 11, 2014 in co-pending U.S. Appl. No. 14/059,784.
Notice of Allowance mailed Nov. 3, 2014 in co-pending U.S. Appl. No. 14/059,784.
Japanese communication issued Oct. 24, 2014 in co-pending Japanese patent application No. 2011-101913.
European communication mailed Nov. 3, 2014 in co-pending European patent application No. EP 12193419.4.
Notice of Allowance mailed Jan. 16, 2015 in co-pending U.S. Appl. No. 13/669,583.

* cited by examiner

AERIAL PHOTOGRAPH IMAGE PICKUP METHOD AND AERIAL PHOTOGRAPH IMAGE PICKUP APPARATUS

BACKGROUND OF THE INVENTION

The present invention relates to an aerial photograph image pickup method and an aerial photograph image pickup apparatus by a small Unmanned Aerial Vehicles (UAV).

In the photography from the air above or the surveying from the air above, the information which cannot be acquired by the photography from the ground or the surveying on the ground can be acquired, and the photography is possible in an off-limits area, or the information in an area where the surveying is difficult can be acquired. Further, in recent years, because of the improvement in performance of a small flying object as remote controlled such as a tiny plane or a small-scale helicopter, or the like, the improvement in a remote control technology, and further, the improvement in performance of an image pickup device, the promotion of the miniaturization, and others, the image pickup device can be mounted in a small flying object. By remotely controlling the flying object, the photography from the air above can be performed in an unmanned manner. Furthermore, the flying object can make an autonomous flight in accordance with a preset flight schedule.

In case of performing the photography by a small flying object, although it is desired for a body to be horizontal, the body actually has a light weight, and the body is often swept away by the wind, or the body is often tilted. Therefore, in a fixedly mounted image pickup device, an optical axis is tilted depending on a state of the body, and a tilt direction is not fixed.

In case of preparing an image in a wide range, or in case of preparing a stereo image, two images adjacent to each other are overlapped, a connecting point (a tie point) common to the two images in the overlap portion is extracted, and based on the tie point, the images are combined. However, as described above, when the images taken in a state that an optical axis is tilted or a tilt angle or a tilt direction is not fixed are sequentially combined with each other, a resultant image in the extensive range is distorted or curved, and there is a problem that a correct combined image cannot be obtained.

SUMMARY OF THE INVENTION

It is an object of the present invention to provide an aerial photograph image pickup method and an aerial photograph image pickup apparatus which can perform the accurate three-dimensional terrain measurement with a simple configuration.

To attain the above object, an aerial photograph image pickup method according to the present invention comprises a step of making a flying object, which comprises a GPS device and an image pickup device for taking an image downward, fly meanderingly, a step of taking the image at each vertex where a direction is changed in the meandering flight, a step of extracting feature points from a common overlap portion of the images taken from at least three vertexes adjacent to each other, a step of determining two images of two vertexes in the images as one set and acquiring positional information of the two vertexes by the GPS device for each set regarding at least two sets, a step of performing photogrammetry of the measuring points corresponding to the feature points based on the positional information and based on the feature points of the two images and a step of determining the feature points when the surveying results of the measuring points coincide with each other in at least the two sets as tie points for image combination.

Further, in the aerial photograph image pickup method according to the present invention, the feature points are extracted from an image taken at one vertex and the image tracking is performed in the feature points and the feature points are specified in an image taken at an next vertex.

Further, in the aerial photograph image pickup method according to the present invention, based on the tie points and the three-dimensional coordinates of the three vertexes measured by the GPS device, a local processing of a calculation of photographing positions of the images taken at the three vertexes and an orientation calculation of tilting are carried out.

Further, an aerial photograph image pickup apparatus according to the present invention comprises a flying object, and a GPS device, navigating means, an image pickup device for taking an image below the flying object, an image processing unit, and a main arithmetic control unit which are provided in the flying object, and in the aerial photograph image pickup apparatus, the main arithmetic control unit has flight plan data for flying the flying object meanderingly, prepares flight guidance data based on positional information from the GPS device and the flight plan data, controls the navigating means based on the flight guidance data, and makes the flying object fly meanderingly and the image pickup device takes the image at each vertex where a direction is changed in the meandering flight, and the image processing unit extracts feature points from a common overlap portion of the images taken from at least three vertexes adjacent to each other, and the main arithmetic control unit determines two images adjacent to each other as one set, performs the photogrammetry for each set regarding at least two sets based on the feature points, determines the feature points as tie points when at least two surveying results coincide with each other, and carries out an orientation calculation of the images based on the tie points and the positional information of the three vertexes.

According to the present invention, in the aerial photograph image pickup method, comprising a step of making a flying object, which comprises a GPS device and an image pickup device for taking an image downward, fly meanderingly, a step of taking the image at each vertex where a direction is changed in the meandering flight, a step of extracting feature points from a common overlap portion of the images taken from at least three vertexes adjacent to each other, a step of determining two images of two vertexes in the images as one set and acquiring positional information of the two vertexes by the GPS device for each set regarding at least two sets, a step of performing photogrammetry of the measuring points corresponding to the feature points based on the positional information and based on the feature points of the two images and a step of determining the feature points when the surveying results of the measuring points coincide with each other in at least the two sets as tie points for image combination. As a result, it is possible to correct a tilting of the images caused due to rolling or pitching of the flying object that cannot be corrected in an image taken in the linear flight.

Further, according to the present invention, in the aerial photograph image pickup method, based on the tie points and the three-dimensional coordinates of the three vertexes measured by the GPS device, a local processing of a calculation of photographing positions of the images taken at the three vertexes and an orientation calculation of tilting are carried out. As a result, the processing can be rapidly executed, and an accurate altitude of the flying object can be calculated locally in substantially real time.

Furthermore, according to the present invention, in the aerial photograph image pickup apparatus comprises a flying object, and a GPS device, navigating means, an image pickup device for taking an image below the flying object, an image processing unit, and a main arithmetic control unit which are provided in the flying object, and in the aerial photograph image pickup apparatus, the main arithmetic control unit has flight plan data for flying the flying object meanderingly, prepares flight guidance data based on positional information from the GPS device and the flight plan data, controls the navigating means based on the flight guidance data, and makes the flying object fly meanderingly and the image pickup device takes the image at each vertex where a direction is changed in the meandering flight, and the image processing unit extracts feature points from a common overlap portion of the images taken from at least three vertexes adjacent to each other, and the main arithmetic control unit determines two images adjacent to each other as one set, performs the photogrammetry for each set regarding at least two sets based on the feature points, determines the feature points as tie points when at least two surveying results coincide with each other, and carries out an orientation calculation of the images based on the tie points and the positional information of the three vertexes. As a result, it is possible to correct the tilting of the images caused due to rolling or pitching of the flying object that cannot be corrected in an image taken in a linear flight.

DETAILED DESCRIPTION OF THE PREFERRED EMBODIMENTS

By referring to the attached drawings, description will be given below on an embodiment of the present invention.

First, in FIG. 1, description will be given on a flight control system of a flying object in which the present invention is applied to.

Figure 1:
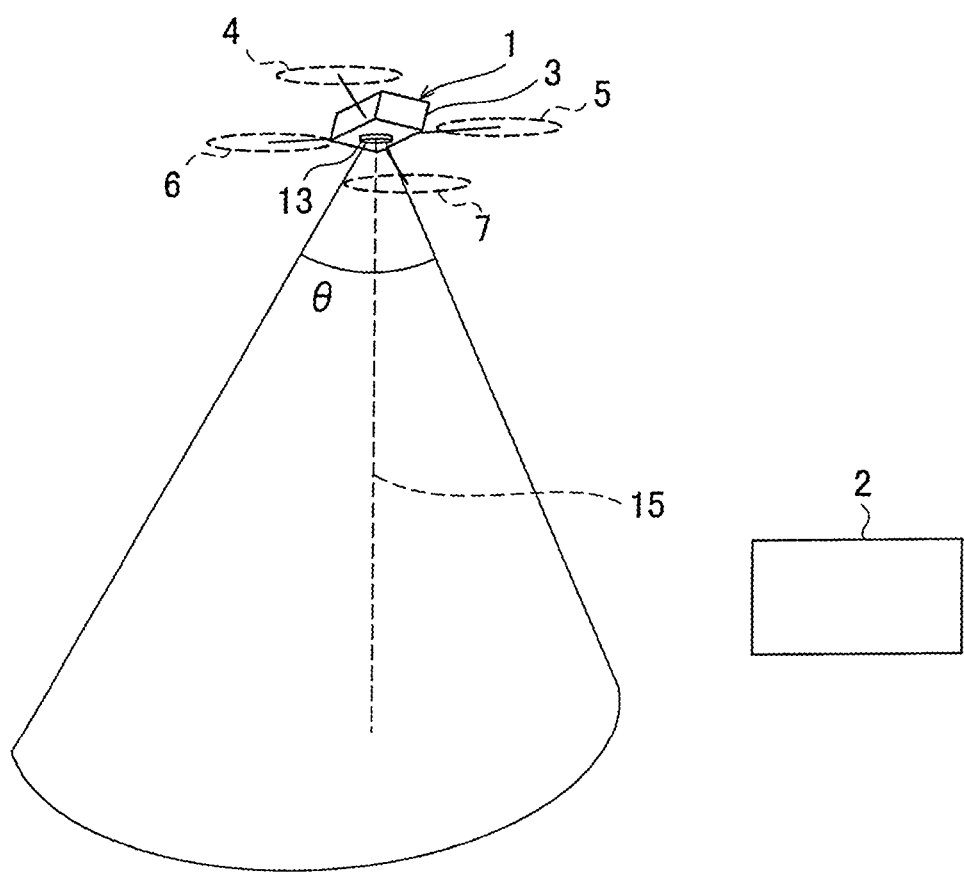
FIG. 1 is a schematical drawing of an aerial photograph image pickup method according to an embodiment of the present invention.

In FIG. 1, the reference numeral 1 represents a flying object which can make an autonomous flight, the reference numeral 2 represents a base control device installed on the ground. The base control device 2 can perform the data communication with the flying object 1 and controls a flight of the flying object 1, sets or changes a flight plan and stores or manages the information collected by the flying object 1.

The flying object 1 is, e.g., a helicopter as a small flying object for making an autonomous flight. The helicopter 1 is flown by the remote control from the base control device 2, or the flight plan is set in a control device 16 (as described later) of the helicopter 1 from the base control device 2, and an autonomous flight is made in accordance with the flight plan.

The helicopter 1 has a helicopter body 3 and a necessary number of propellers provided to the helicopter body 3, e.g., four propellers, i.e., front, rear, left, and right propellers 4, 5, 6, and 7. The propellers 4, 5, 6, and 7 are individually coupled with a first motor 8, a second motor 9, a third motor 10, and a fourth motor 11 (as described later), respectively, and driving of each of the first motor 8, the second motor 9, the third motor 10, and the fourth motor 11 can be independently controlled as described later. It is to be noted that the propellers 4, 5, 6, and 7, the first motor 8, the second motor 9, the third motor 10, the fourth motor 11, and others constitute a navigating means for the flying object.

An image pickup device 13 and the control device 16 (as described later) are provided in the helicopter body 3 of the helicopter 1. The image pickup device 13 acquires a digital image. The image pickup device 13 may be a camera for taking the still images at predetermined time intervals or a video camera for continuously taking the images. The image pickup device 13 is provided on a lower surface of the helicopter body 3. Furthermore, as an image pickup element, the image pickup device 13 has a CCD and a CMOS sensor which are aggregations of pixels, and a center of the image pickup element (a coordinates center of a photodetecting surface) coincides with an optical axis 15 of the image pickup device 13.

A position on the image pickup element (the coordinates) of each pixel in the image pickup element can be specified so that a field angle (an angle with respect to the optical axis 15) of each pixel can become obvious.

The optical axis 15 runs through a reference position (e.g., the machine center) of the helicopter body 3, and the optical axis 15 is set in such manner that the optical axis 15 coincides with a vertical line when the helicopter 1 takes a horizontal posture. The image pickup device 13 has a view angle of an angle θ and can acquire the images for aerial photographs. Additionally, the images taken by the image pickup device 13 are also used as image data for the positional measurement as described later.

The image taken by the image pickup device 13 is associated with time for taking the image, with geocentric coordinates (the three-dimensional coordinates) measured by a GPS device 23 (as described later), and is stored in a first storage unit 25 (as described later).

Figure 2:
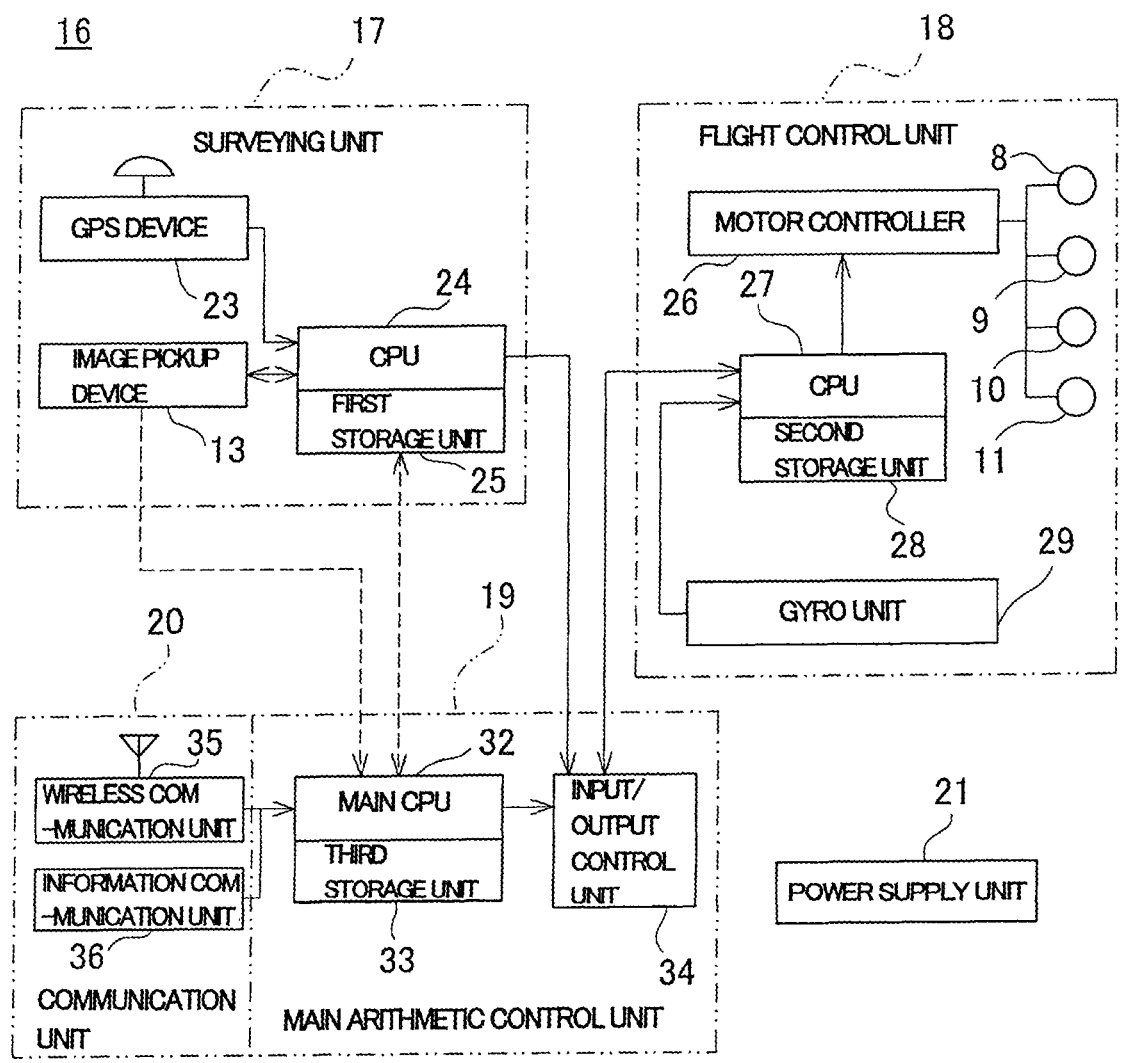
FIG. 2 is a block diagram of a control device mounted in a flying object according to the embodiment of the present invention.

FIG. 2 shows the control device 16 provided in the helicopter body 3. The control device 16 is mainly constituted of a surveying unit 17, a flight control unit 18, a main arithmetic control unit 19, a communication unit 20, and a power supply unit 21.

The surveying unit 17 is constituted of the GPS device 23, a surveying unit CPU 24, the first storage unit 25, the image pickup device 13, and others. It is to be noted that the surveying unit CPU 24 and the first storage unit 25 constitute an image processing unit, and the image processing unit executes the extraction of a feature point (as described later), the image tracking processing, and others.

The GPS device 23 is configured to measure a reference position of the helicopter 1, e.g., the machine center, the GPS device 23 measures the absolute three-dimensional coordinates of the reference position, and a measurement value represents a ground coordinates system and an altitude obtained from a geocentric coordinates (absolute coordinates) system.

Further, when the helicopter 1 is in the horizontal posture, the optical axis 15 runs through the reference position and is vertical. Therefore, the image pickup device 13 can acquire an image in a range of a necessary view angle θ immediately below the helicopter 1, and the center of the image is set in such manner that the center of the image coincides with the reference position.

In the first storage unit 25, the image acquired by the image pickup device 13 and a time at which the image was acquired are stored in such manner that the time associated with the image. Further, the three-dimensional coordinates of the helicopter 1 are measured by the GPS device 23 in synchronization with the time at which the image was acquired, and the three-dimensional coordinates as measured are also associated with the time at which the image was acquired and stored in the first storage unit 25.

Furthermore, in the first storage unit 25, programs, such as an image pickup control program, a three-dimensional position measuring program, an image processing program, and a tracking processing program and others are stored. Moreover, in the first storage unit 25, the image taken by the image pickup device 13, a time of the image pickup, and the three-dimensional coordinates when the image was acquired are associated with the image and are stored.

Based on a flight velocity of the helicopter 1 and a view angle θ of the image pickup device 13, and others, the image pickup control program controls the acquisition timing of the image data taken by the image pickup device 13 in such manner that the images adjacent to each other in terms of time overlap at a predetermined rate and that the images taken at vertexes (as described later) adjacent to each other overlap at a predetermined rate. When performing the image tracking, the image pickup control program controls the image pickup device 13 so that the image pickup device 13 takes the image at the predetermined time intervals or continuously while acquiring a image data and the next image data.

The image processing program executes the image processing, e.g., extracting a feature point (a tie point) from the image acquired by the image pickup device 13 or combining a plurality of images with the tie point as reference.

Further, the tracking processing program performs the image tracking of the feature point between the images adjacent to each other in terms of time and specifies the feature point of the image into the next image one after another. It is to be noted that the image tracking is disclosed in Japanese Patent Application Publication No. 2006-10376 or Japanese Patent Application Publication No. 2007-171048.

Based on the ground coordinates obtained by the measurement of the GPS device 23 and the tie point extracted from the images of image pickup device 13, the three-dimensional position measuring program calculates a height distance of the helicopter 1 (a reference position) according to a measurement method, e.g., the photogrammetry or the like. Therefore, as the height of the helicopter 1, there can be obtained two types of heights, i.e., a first height distance obtained by the measurement of the GPS device 23 and a second height distance obtained based on the image by the photogrammetry.

The first height distance is used when determining the tie point as described later, the photogrammetry is performed regarding the second height distance based on the feature point as determined, and the second height distance has a higher accuracy compared to an accuracy of the first height distance.

The three-dimensional position measuring program, acquired image, a position, a time at which the image was acquired, and others may be stored in a third storage unit 33 (as described later). In this case, a main CPU 32 executes the arithmetic processing required for the measurement.

The surveying unit CPU 24 controls the image pickup by the image pickup device 13 according to the image pickup control program, carries out the image tracking according to the tracking processing program, extracts the tie point and combines a plurality of images according to the image processing program, and calculates the second height distance according to the three-dimensional position measuring program.

The flight control unit 18 comprises the first motor 8, the second motor 9, the third motor 10, the fourth motor 11, a motor controller 26 for individually driving and controlling these motors, a flight control CPU 27 for controlling the motor controller 26, a second storage unit 28, and a posture detector, e.g., a gyro unit 29 for detecting a posture state (a tilting) of the helicopter 1 with respect to the horizontal state and generating a posture state signal.

In the second storage unit 28, a flight control program for calculating flight states such as a flight velocity, an ascending velocity, a descending velocity, a flight direction, a flight altitude, and others based on the flight guidance data from the main arithmetic control unit 19 is stored, and a posture control program for calculating information for posture control based on the posture state signal from the gyro unit 29 and other programs are stored.

The flight control CPU 27 transmits a flight control command to the motor controller 26 according to the flight control program and the flight guidance data, controls the first motor 8, the second motor 9, the third motor 10, and the fourth motor 11 via the motor controller 26, and executes a predetermined flight. The flight control CPU 27 also transmits a posture control command to the motor controller 26 according to the posture control program, and controls the first motor 8, the second motor 9, the third motor 10, and the fourth motor 11, respectively via the motor controller 26. As a result, the flight control CPU 27 maintains a posture in such manner that the flying object can fly.

The main arithmetic control unit 19 comprises the main CPU 32, a third storage unit 33, and an input/output control unit 34, and the third storage unit 33 stores programs such as an integration program, a flight guidance program, a communication control program, and others and also stores the flight plan data. The data stored as the flight plan data includes, e.g., a flight course, a flight altitude, a position and a range of image pickup, and others.

The integration program integrates and controls the surveying unit 17 and the flight control unit 18. The flight guidance program prepares the flight guidance data from the flight plan data and the positional information obtained by the GPS device 23.

Further, the main CPU 32 prepares the flight guidance data according to the flight guidance program and outputs the flight guidance data to the flight control unit 18 via the input/output control unit 34 based on the integration program at the necessary timing. Furthermore, based on an altitude measurement result from the surveying unit 17, the main CPU 32 also transmits the flight guidance data to the flight control unit 18 so as to maintain a predetermined altitude from the ground surface. It is to be noted that, as the altitude measurement result for controlling a flight, either the first height distance or the second height distance may be used.

The communication unit 20 is constituted of a wireless communication unit 35, an information communication unit 36, and others, and the wireless communication unit 35 receives a remote flight control command from a ground base and communicates the flight state of the helicopter 1 to the ground base. Moreover, the information communication unit 36 is configured to transmit/receive the information between the ground base and the helicopter 1 by using a communicating means such as a wireless LAN or the Bluetooth (a registered trademark) or the like, for example, in a state that the helicopter 1 lands on the base, the flight plan data is transmitted from the base to the helicopter 1, or information of an image, a position, and the time acquired during the flight are transmitted from the helicopter 1 to the base.

The power supply unit 21 is e.g., a replaceable chargeable battery and replaced with a charged battery when the helicopter 1 lands on the base, and a used-up battery is charged until the next replacement. During a flight, the power supply unit 21 supplies the necessary electric power to the surveying unit 17, the flight control unit 18, the main arithmetic control unit 19, and the communication unit 20.

The images acquired by the image pickup device 13, the positional information measured by the surveying unit 17, and the information of the tie point are communicated to the base control device 2 via the communication unit 20. The base control device 2 prepares a combined image of a wider range based on the images, and also prepares a stereo image, or performs the photogrammetry based on the stereo image.

The surveying unit CPU 24, the flight control CPU 27, and the main CPU 32 constitute an arithmetic unit of the helicopter 1. As described above, the surveying unit CPU 24, the flight control CPU 27, and the main CPU 32 may be provided to each of the surveying unit 17, the flight control unit 18, and the main arithmetic unit 19, or one arithmetic unit may be provided, and a function of the surveying unit CPU 24, a function of the flight control CPU 27, and a function of the main CPU 32 may be assigned to this arithmetic unit. Alternatively, the main CPU 32 may be employed as the arithmetic unit, the main CPU 32 may be made to execute the processing of one or both of the surveying unit CPU 24 and the flight control CPU 27, and one or both of the surveying unit CPU 24 and the flight control CPU 27 may be omitted.

Further, the first storage unit 25, the second storage unit 28, and the third storage unit 33 constitute a storage unit of the helicopter 1. As described above, the first storage unit 25, the second storage unit 28, and the third storage unit 33 may be individually provided, or the storage unit may be configured as one storage device, and memory regions corresponding to the first storage unit 25, the second storage unit 28, and the image pickup device 13 may be set in the storage device.

Next, by referring to FIG. 3, description will be given on the distance measurement based on the photogrammetry.

Figure 3:
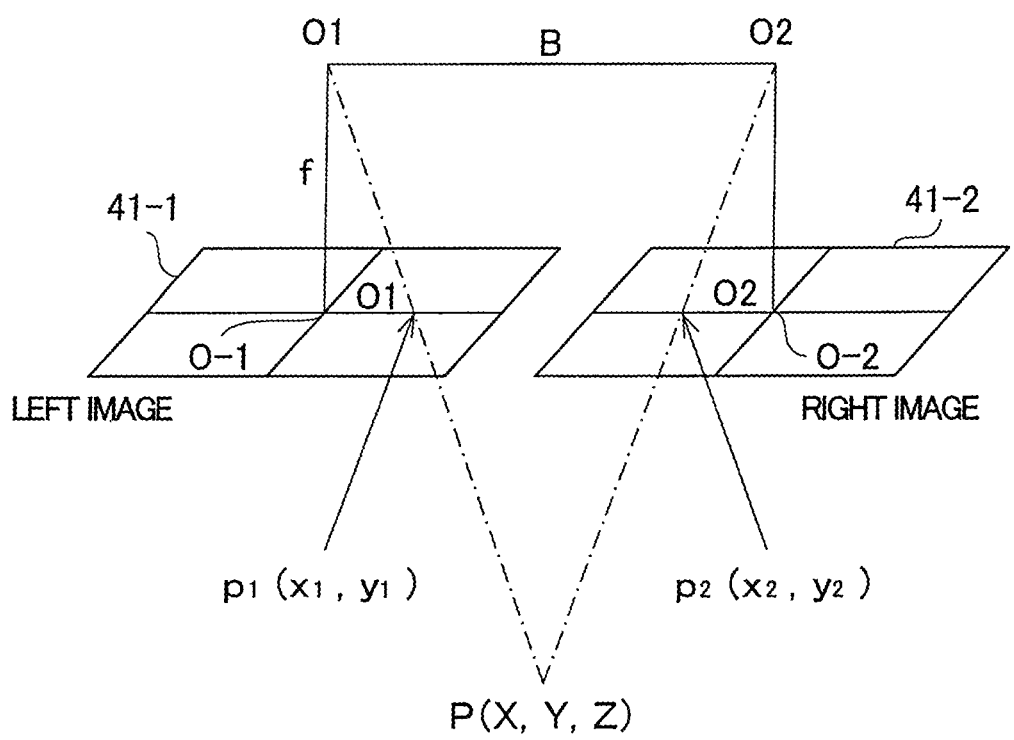
FIG. 3 is an explanatory drawing in a case where the photogrammetry of an altitude of the flying object and coordinates of a measuring point from images taken at two points by the flying object.

In FIG. 3, it is assumed that the helicopter 1 flies from a point O1 to a point O2 and takes images at the point O1 and the point O2. Additionally, a distance B from the point O1 to the point O2 is a photographing base line length, and each of the reference numerals 41-1 and 41-2 represents an image pickup element 41 of the image pickup device 13 at each of the point O1 and the point O2 and is equivalent to the image data. It is to be noted that FIG. 3 shows a situation that the optical axis 15 of the image pickup device 13 is vertical, namely, the helicopter 1 is in the horizontal posture.

A position on an image (i.e., on the image pickup element) of a measuring point P taken at the point O1 is p1 (x1, y1), and a position on an image (i.e., on the image pickup element) of the measuring point P taken at the point O2 is a p2 (x2, y2). Assuming that a distance from the center O-1 (an origin) of an image pickup element 41-1 to p1 is 11 and a distance from the center O-2 (an origin) of an image pickup element 41-2 to p2 is 12, a focal length f of the image pickup device 13 and a distance Z from the photographing base line length B to P (a height distance of the helicopter 1) are represented as $Z = Bf/(11+12)$ based on a similarity relation of a triangle O1, O2, P, a triangle O1, O-1, p1, and a triangle O2, O-2, p2.

Here, the ground coordinates of the point O1 and the point O2 can be measured by the GPS device 23, the photographing base line length B is a distance between two points, i.e., the point O1 and the point O2, and the photographing base line length B can be obtained based on the measurement results of the GPS device 23. Further, a geocentric position (the plane coordinates) of the measuring point P can be likewise obtained from p1 (x1, y1), p2 (x2, y2), and the geocentric positions of the point O1 and the point O2 measured by the GPS device 23.

Therefore, it is possible to make a measurement (a height distance measurement) of an altitude (a height from the ground surface) of the helicopter 1 in real time from two images sequentially taken in a process that the helicopter 1 moves.

The GPS device 23 can measure the three-dimensional coordinates, a height position can be obtained at the same time with the ground coordinates, but the height position to be obtained is an absolute position and different from a height from the ground surface. Furthermore, as characteristics of the GPS device 23, a measurement result of the height position is apt to be affected by a reception status of the GPS device 23 from a satellite as compared with the ground coordinates, and an accuracy of this measurement result is inferior to an accuracy of the ground coordinates.

In the photogrammetry, since the measurement is made from an image using the highly accurate ground coordinates, a measurement result with a high accuracy can be obtained, and a height distance from the ground can be obtained.

In the above-described photogrammetry, p1 (x1, y1) and p2 (x2, y2) correspond to a point common to the image taken at the point O1 and the image taken at the point O2, and p1 and p2 correspond to the tie point.

In regard to the above photogrammetry, the situation where the helicopter 1 is in the horizontal posture has been described, but the helicopter 1 is small and lightweight and apt to be affected by the wind and others, and it is actually often the case that the posture of the helicopter 1 is changed every time the photography is carried out.

Therefore, the images are acquired in a state that the helicopter body 3 linearly flies and rolls with respect to an advancing direction. In a case where the plurality of acquired images are combined, or in a case where a distance is measured based on the images, or in a case where the images are combined into a wide range image or a stereo image is prepared, the image may be deformed, the image is distorted, or an accuracy of the distance measurement is deteriorated.

In this embodiment, even in a case where the posture of the helicopter 1 (the helicopter body 3) is changed, the accurate measurement can be performed from the images, or the images can be appropriately combined.

Figure 4:
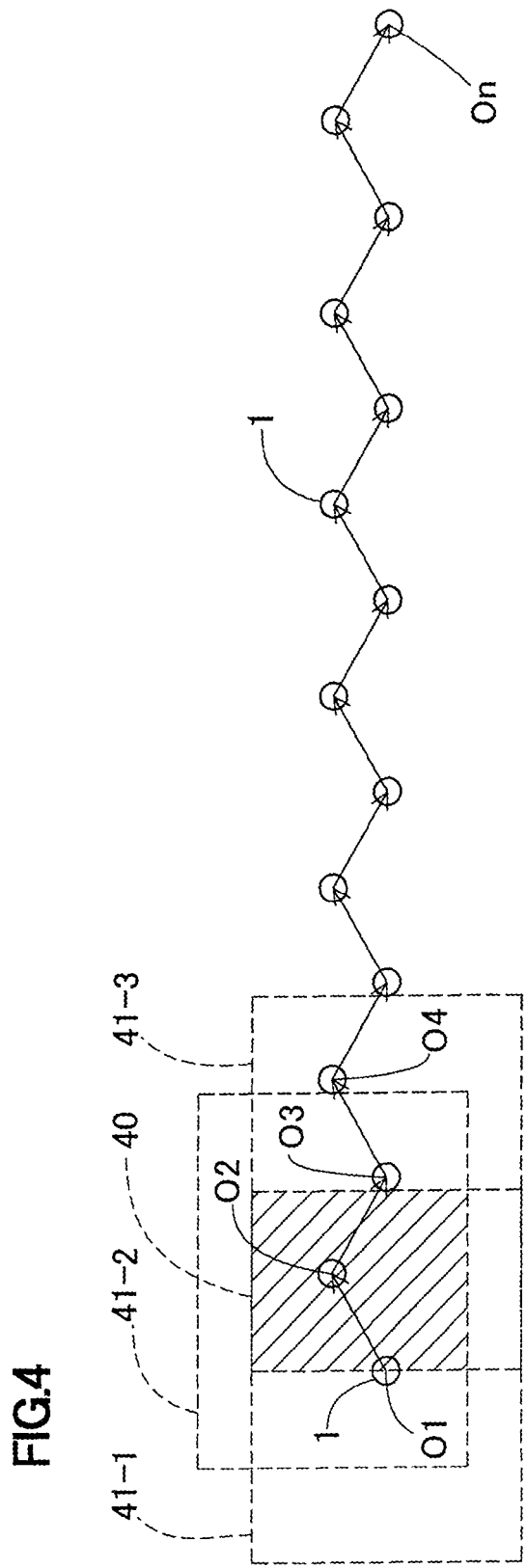
FIG. 4 is an explanatory drawing showing a relationship between a trajectory made by the flying object in the meandering flight and the points at which the image pickup is carried out.

In this embodiment, the helicopter 1 is made to fly in a meandering pattern as shown in FIG. 4, the photography is carried out at the respective vertexes (O1, O2, O3, O4, . . . , On) where a direction of the flight is changed, the three images 41-1, 41-2, and 41-3 taken at the three vertexes adjacent to each other (O1, O2, and O3 in the drawing) are determined as one set, the triplet matching is performed. By carrying out the triplet matching, correspondence (determination) of the tie point is performed accurately. Furthermore, the images which the triplet matching is performed regarding are rearranged so as to include the latest image every time of the image pickup and, when an image is taken at the vertex O4, the images taken at O2, O3, and O4 are subjects of the triplet matching. Therefore, the triplet matching is executed every time the direction of the flight is changed. Moreover, a distance between the vertexes at which the direction is changed or a time interval of the image pickup is set by a flight schedule in such manner that an overlap portion 40 (a hatching portion in FIG. 4) where the triplet matching is possible can be obtained.

By referring to FIG. 5, description will be given on the triplet matching. The height measurement (the photogrammetry) by every two images in three images is carried out, and the height distance measurement by the two images is carried out like the above description.

Figure 5:
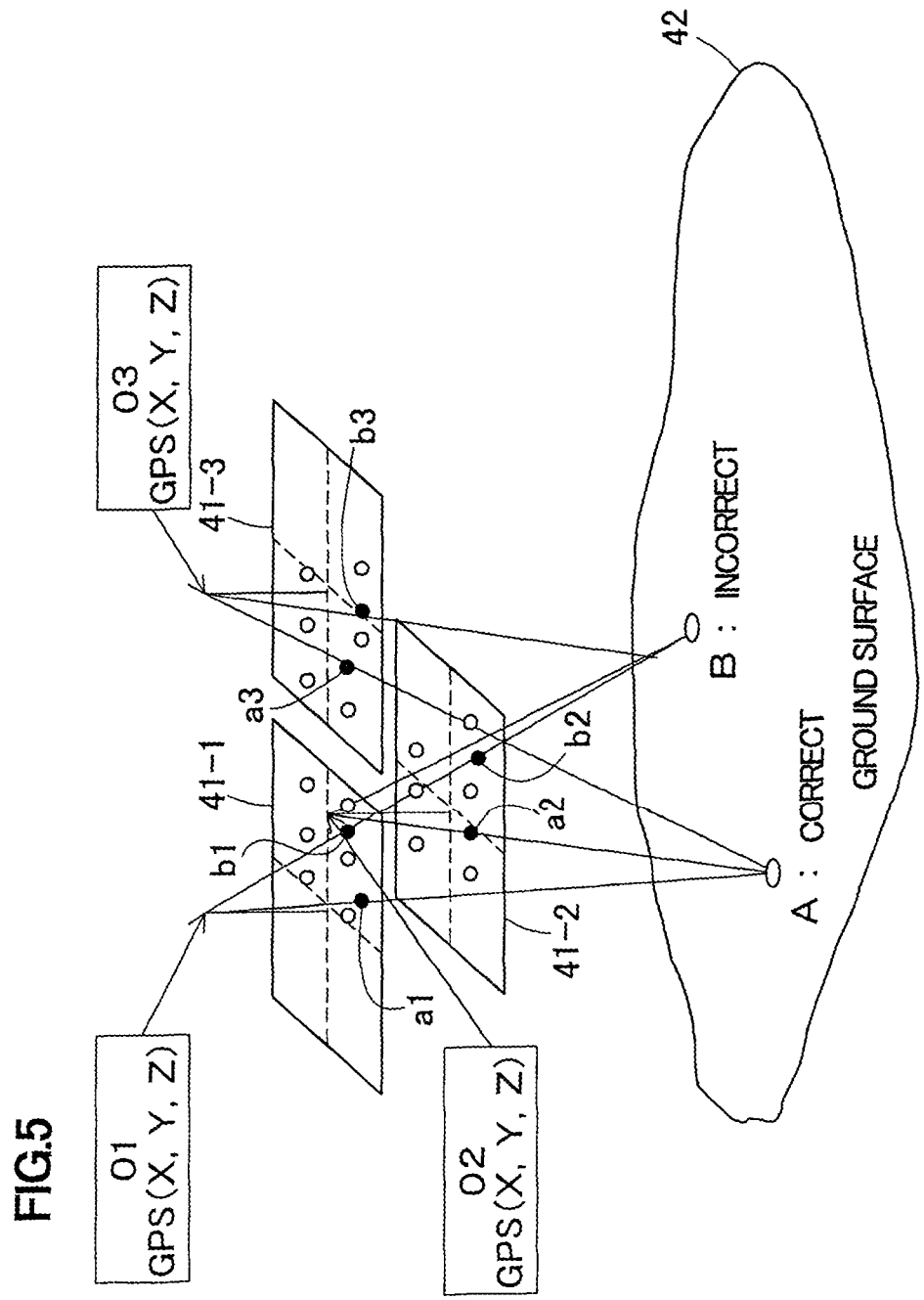
FIG. 5 is an explanatory drawing showing a match and a mismatch of the measurement results in respective sets in a case where based on the extracted feature points where two images are extracted as one set and based on the positional information of the image pickup points, measurement on the ground surface corresponding to the feature point is carried out.

FIG. 5 schematically shows a state that the altitude measurement is sequentially carried out from the images taken by the helicopter 1 in flight. Furthermore, in FIG. 3, although the altitude measurement of the helicopter 1 has been described, in regard to an entire image taken by the image pickup device 13, it is possible to perform the height distance measurement of an arbitrary region in the image, i.e., the height measurement of a region in a ground surface 42 corresponding to the region in the image.

The image processing is performed regarding an image of the ground surface 42 taken by the image pickup device 13, and feature points a to n are extracted from the image. The extraction of the feature points is executed by the appropriate image processing, e.g., the edge processing or the contrast processing, or the like.

Moreover, the feature points extracted from the image taken at one vertex must be sequentially specified into an image taken at the subsequent adjacent vertex. As a specifying method, there is the image tracking. In the image tracking, the images are acquired from one vertex to the next vertex continuously or at predetermined time intervals, the feature points are specified one after another in the image (the image tracking) which is adjacent in terms of time, and the feature points in the image at the one vertex are corresponded to the image at the next vertex.

Since the triplet matching is carried out, the feature points are selected in the overlap portion 40 (see FIG. 4) where three images overlap.

In two images in three images, for example, feature points a1 and b1 are extracted in the image 41-1 at the point O1, the feature points a1 and b1 are specified as feature points a2 and b2 in the image 41-2 at the point O2 by the tracking, and the height measurement of the feature points a and b are carried out according to the images 41-1 and 41-2. Furthermore, the ground coordinates of the feature points a and b are calculated based on the measurement results of the GPS device 23. Then, the three-dimensional coordinates of the feature points a and b are calculated.

Moreover, in other two images, i.e., the image 41-2 at the point O2 and the image 41-3 at the point O3, the feature points are tracked from the image 41-2 at the point O2 to the image 41-3 at the point O3 for the heights of the feature points a and b are determined based on the feature points (a2, b2) in the image 41-2 and the feature points (a3, b3) in the image 41-3 at the point O3. Additionally, the ground coordinates of the feature points a and b are calculated based on the measurement results of the GPS device 23.

Further, absolute heights at the point O1, the point O2, and the point O3 at the time of image pickup can be also measured by the GPS device 23. Each of the absolute heights measured by the GPS device 23 represents an absolute height at the reference position of the helicopter 1, and does not represent a height from the ground surface, but a relative position relationship in height between the point O1, the point O2, and the point O3 can be obtained. Furthermore, the measurements taken at the point O1, the point O2, and the point O3 at the time of image pickup are close to each other in terms of time and distance, and it can be judged that the relative accuracy of the heights measured by the GPS device 23 is high.

In the above description, the two points, i.e., the feature points a and b have been described, the feature points are extracted from whole image. Therefore, when the three-dimensional coordinates of the feature points can be obtained, the conditions of the ground surface 42, e.g., the ruggedness, a tilting, and others can be also measured.

As described above, in regard to measuring points A and B on the ground corresponding to the extracted feature points, the height measurement according to the two sets of images is performed, and the two sets of three-dimensional coordinates can be obtained with respect to each of the measuring points A and B.

By comparing the two sets of three-dimensional coordinates, it is possible to determine whether the feature points, which are specified by the sequential tracking from the image 41-1 to the image 41-2 and further, from the image 41-2 to the image 41-3, are accurate or not.

As shown in FIG. 5, the two sets of three-dimensional coordinates calculated in regard to the feature point a coincide with each other, and the tracking is accurately performed from the image 41-1 to the image 41-3, and it is possible to judge that the measurement results are appropriate (correct).

However, in regard to the feature point b, when the three-dimensional coordinates calculated based on the image 41-1 and the image 41-2 do not coincide with the three-dimensional coordinates calculated based on the image 41-2 and the image 41-3, or in a case where the set accuracy range is exceeded, it is possible to judge that the tracking was not appropriate or the measuring point measured was deviated (incorrect). In this case, the measurement result of the feature point b is deleted.

Therefore, in regard to each of all the extracted feature points, two sets of three-dimensional coordinates are obtained, based on the two sets of three-dimensional coordinates determination of correct/incorrect is performed, and only the measurement result of the feature point determined to be correct is stored in the first storage unit 25.

Based on another set of two images, i.e., the image 41-1 at the point O1 and the image 41-3 at the point O3 and the feature points (a1, b1) and (a3, b3), another set of three-dimensional coordinates can be obtained with respect to the measuring points A and B. In a case where the obtained three sets of three-dimensional coordinates coincide with each other, or are within a predetermined accuracy, or in a case where two in the three sets of three-dimensional coordinates coincide with each other or are within the predetermined accuracy (in the following description, a case where the three-dimensional coordinates coincide with each other, or within the predetermined accuracy is regarded as coincidence, the measurement results may be determined to be correct.

The feature point determined to be correct is decided as a tie point, the image 41-1, the image 41-2, and the image 41-3 are combined, an image in a wide range is prepared, or a stereo image is prepared.

Figure 6:
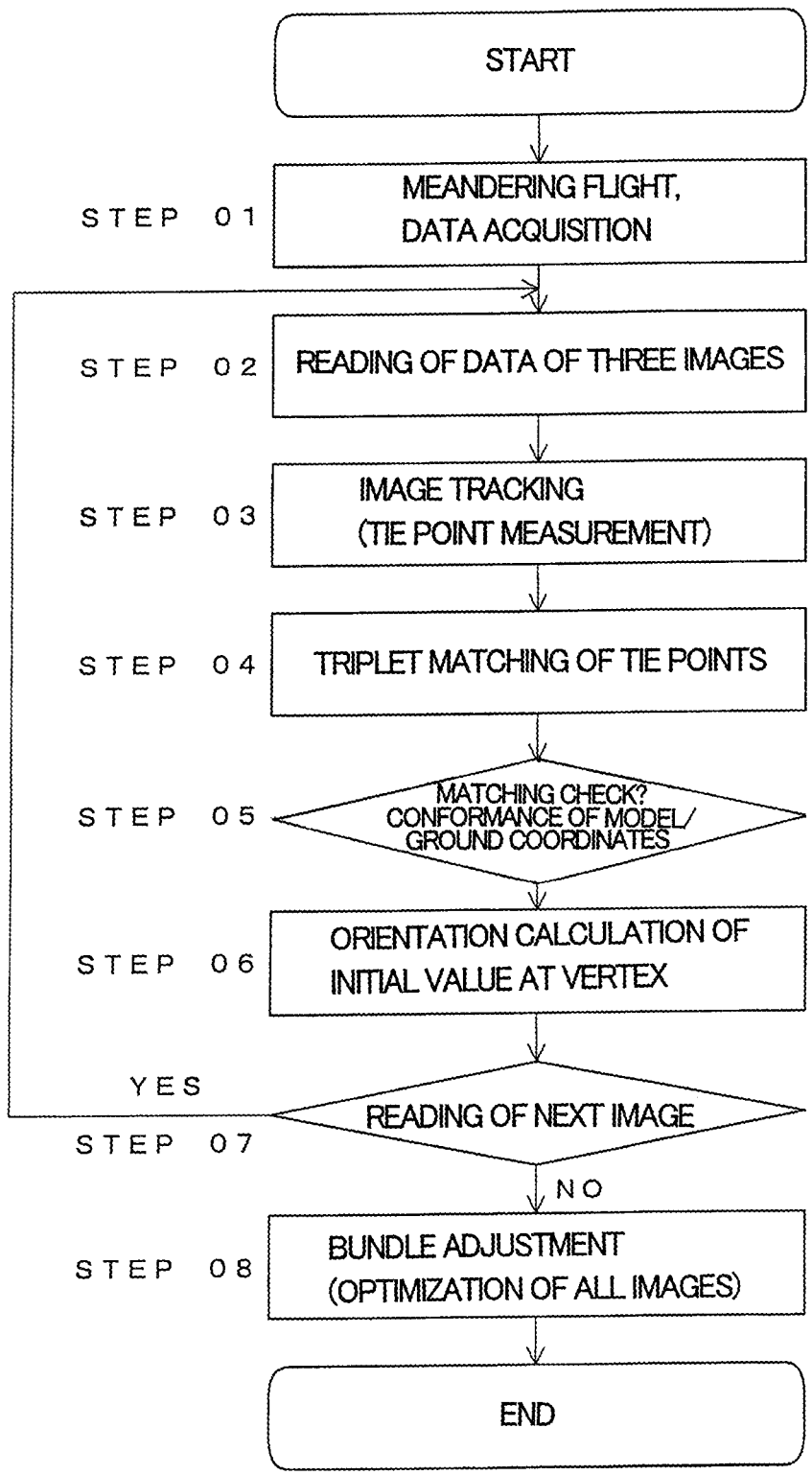
FIG. 6 is a flow chart showing an operation of the present embodiment.

Further, by referring to FIG. 6, description will be given on the triplet matching and a flow of combining the images.

STEP 01 When the helicopter 1 flies and reaches a scheduled measurement range, a meandering flight begins in accordance with the flight plan. While the meandering flight is made, the images are taken (or continuous images are taken) by the image pickup device 13 at predetermined intervals, and the images as taken are stored in the first storage unit 25. Further, an image at each vertex is obtained and the three-dimensional coordinates measured by the GPS device 23 are acquired at the time when the image at the vertex is obtained.

STEP 02 The image data of the three vertexes adjacent to each other is read, and the overlap portion 40 where the three images overlap is calculated and set.

STEP 03 In the overlap portion 40, the feature points are extracted, the image tracking of the feature points is performed between the images acquired at the respective vertexes, and the feature points common to the images of the respective vertexes are specified.

STEP 04 Based on the specified feature points and based on the three-dimensional coordinates of image pickup position at the three vertexes, the triplet matching is performed. Further, two images adjacent to each other are determined as one set, the photogrammetry is carried out with respect to each set based on the feature points (the tie points) and the images, and the three-dimensional coordinates of the measuring points corresponding to the feature points are obtained.

STEP 05 The three-dimensional coordinates obtained from the images in each set are compared with each other, and a determination of correct/incorrect is executed whether these three-dimensional coordinates coincide with each other. Only the surveying results determined to be correct are acquired as the measurement data.

STEP 06 Orientation calculation of tilting of still images photographed at three vertexes is executed based on the measurement values (the three-dimensional coordinates) of the GPS device 23 in regard to the vertexes, i.e., the positional information of the image pickup device 13 and based on the feature points as the tie points. When the orientation calculation is executed, a distance between two vertexes (the base line length) and a rotational angle of the image pickup device 13 (a direction of the image pickup device 13) at each vertex are determined, and a stereo image having the three-dimensional data can be prepared.

STEP 07 Further, it is judged whether images to be read are still present or not, and if the images to be read are present, the processing of STEP 02 to STEP 06 is repeated. If there is no image to be read, the processing advances to STEP 08. Moreover, a local processing of calculation of the photographing positions of the images acquired at the three vertexes and the local processing of the orientation calculation of the tilting are executed, and the local processing is repeated. As a result, the processing can be rapidly carried out and an accurate altitude of the flying object 1 can be calculated in real time or in substantially real time.

STEP 08 The image orientation (the local orientation) for the images of the three vertexes as one set is sequentially and continuously carried out, the initial values of the positions and the tilting of the image pickup device 13 about the still images taken at the respective vertexes are obtained. The analysis is eventually collectively performed by the bundle adjustment (a block), and the camera positions and the tilting at the respective vertexes where the images are taken are calculated with a high accuracy. Based on the obtained camera positions and the tilting, all the images are optimized, or all the images are combined, and a stereo image is prepared.

The invention claimed is:

1. An aerial photograph image pickup method comprising:
   making a flying object fly meanderingly, wherein said flying object comprises a GPS device and an image pickup device for taking an image downward,
   taking the image at each vertex where a direction is changed in the meandering flight,
   acquiring a three-dimensional coordinate of each vertex by said GPS device,
   extracting feature points from a common overlap portion of three images taken from at least three vertexes adjacent to each other,
   performing triplet matching with respect to said three images based on said three-dimensional coordinates and said feature points,
   performing photogrammetry of measuring points corresponding to said feature points based on said three-dimensional coordinates acquired at two vertexes by said GPS device by determining two images of two vertexes in said images as one set for each set regarding at least two sets and based on said feature points of said two images, and
   determining said feature points when the surveying results of said measuring points coincide with each other in at least said two sets as tie points for image combination.

2. The aerial photograph image pickup method according to claim 1, wherein said feature points are extracted from an image taken at one vertex and the image tracking is performed in said feature points and said feature points are specified in an image taken at an next vertex.

3. The aerial photograph image pickup method according to claim 1 or 2, wherein, based on said tie points and the three-dimensional coordinates of said three vertexes measured by said GPS device, a local processing of a calculation of photographing positions of said images taken at said three vertexes and an orientation calculation of tilting are carried out.

4. An aerial photograph image pickup apparatus comprising a flying object, and a GPS device, navigating means, an image pickup device for taking an image below said flying object, an image processing unit, and a main arithmetic control unit which are provided in said flying object, wherein said main arithmetic control unit has flight plan data for flying said flying object meanderingly, prepares flight guidance data based on positional information from said GPS device and said flight plan data, controls said navigating means based on said flight guidance data, and makes said flying object fly meanderingly and said image pickup device takes the image at each vertex where a direction is changed in the meandering flight, and said image processing unit extracts feature points from a common overlap portion of three images taken from at least three vertexes adjacent to each other, performs triplet matching with respect to said three images based on said feature points and based on said positional information of three vertexes acquired by said GPS device, and said main arithmetic control unit determines two images adjacent to each other as one set, performs the photogrammetry for each set regarding at least two sets based on said feature points and said positional information, determines said feature points as tie points when at least two surveying results coincide with each other, and carries out an orientation calculation of said images based on said tie points and the positional information of said three vertexes.

* * * * *